United States Patent [19]

Iacovangelo et al.

[11] Patent Number: 5,198,265
[45] Date of Patent: Mar. 30, 1993

[54] METHOD OF COATING AN ALUMINUM COMPOUND SUBSTRATE WITH A COMPOSITION OF ELEMENTAL TITANIUM AND AN ALKALI METAL HALIDE, MELTING THE COATING, AND RINSING THE COATED SUBSTRATE

[75] Inventors: Charles D. Iacovangelo, Schenectady; Randall N. King, St. Johnsville, both of N.Y.

[73] Assignee: General Electric Company, Schenectady, N.Y.

[21] Appl. No.: 824,269

[22] Filed: Jan. 23, 1992

Related U.S. Application Data

[62] Division of Ser. No. 678,401, Apr. 1, 1991, abandoned.

[51] Int. Cl.$^5$ ............................................. B05D 5/12
[52] U.S. Cl. .............................. 427/126.2; 427/126.3; 427/376.3; 427/376.6; 427/377; 427/443.1; 204/192.1; 205/163; 205/213
[58] Field of Search ............... 428/627, 632; 427/191, 427/193, 203, 376.6, 383.5, 443.1, 430.1, 126.2, 126.3, 376.3, 377; 204/192.1; 205/213, 163

[56] References Cited

U.S. PATENT DOCUMENTS

| | | | |
|---|---|---|---|
| 4,159,357 | 6/1979 | Grunke | 427/383.5 |
| 4,459,328 | 7/1984 | Mizuhara | 427/376.6 |
| 4,532,190 | 7/1985 | Kanbe et al. | 428/627 |
| 4,740,429 | 4/1988 | Tsuno | 428/627 |
| 4,820,562 | 4/1989 | Tanaka et al. | 427/383.5 |
| 4,980,239 | 12/1990 | Harada | 428/552 |
| 5,023,147 | 6/1991 | Nakata et al. | 428/627 |

FOREIGN PATENT DOCUMENTS 58-140381 8/1983 Japan.
59-57976 4/1984 Japan.

*Primary Examiner*—Shrive Beck
*Assistant Examiner*—Benjamin L. Utech
*Attorney, Agent, or Firm*—William H. Pittman

[57] ABSTRACT

An adherent layer comprising elemental titanium, optionally in combination with another metal such as copper, is deposited on a substrate, preferably of alumina or aluminum nitride, and serves as a base for a further conductive coating which may be applied by electroless or electrolytic deposition. The adherent layer is applied by contacting the substrate with a mixture of the elemental metal(s) and a substantially anhydrous salt composition, preferably an equimolar mixture of potassium chloride and sodium chloride; heating at a temperature and for a time sufficient to melt said salt composition; and removing said salt composition, preferably by water washing.

13 Claims, No Drawings

METHOD OF COATING AN ALUMINUM COMPOUND SUBSTRATE WITH A COMPOSITION OF ELEMENTAL TITANIUM AND AN ALKALI METAL HALIDE, MELTING THE COATING, AND RINSING THE COATED SUBSTRATE

This application is a division of application Ser. No. 07/678,401, filed Apr. 1, 1991.

This invention relates to the deposition of conductive metals on ceramics, and more particularly to the improvement of adhesion between the metal and the ceramic.

Electronic circuitry comprising conductive metal traces on ceramic substrates is in common use. Circuits of the thick film type have been prepared by screen-printing a mixture of glass and a conductive metal, typically copper or a precious metal, on the substrate. More recently, thinner conductive traces have been prepared by methods such as sputtering, electrolytic deposition, electroless deposition or combinations thereof, followed by patterning of the conductive metal layer by photolithography or its substantial equivalent and etching away of the metal in areas where conduction is not desired.

The employment of circuitry of this type for microwave circuit applications has been slow to develop, because of the difficulty of providing adhesion between the metal and the substrate. Microwave circuits generally require interactions involving gigahertz frequencies at the interface between the substrate and the conductor. Such frequencies in turn require very thin conductive traces and a smooth ceramic substrate such as alumina or aluminum nitride, the latter substrate being particularly applicable in power circuits by reason of its high thermal conductivity.

It is very difficult, however, to provide a strongly adherent metal coating on an alumina or similar smooth surface. Adhesion is typically maximized by etching the surface, often with an alkaline reagent; such etching operations are disclosed, for example, in U.S. Pat. Nos. 4,574,094 and 4,604,299. However, such etching of an alumina or aluminum nitride surface is difficult at best, and when achievable it destroys the capability of the circuit assembly to transmit in gigahertz frequencies. Moreover, it is extremely difficult to achieve a uniform degree of etching of any substrate, and the improvement in adhesion provided via an etching operation is often only marginal.

A second method of improving adhesion, disclosed, for example, in U.S. Pat. Nos. 3,766,634 and 3,994,430, involves the formation of a bonding layer between the conductive metal and the substrate. Typical bonding layers are eutectic mixtures of the metal and a compound thereof, often an oxide and preferably a spinel. However, the formation of spinels and other oxides requires an oxidation step, which in turn requires close control of the degree of oxidation in a well controlled thermal cycle. In addition, it is usually necessary to provide the copper in the form of a foil which is too thick for employment in microwave circuitry, requiring uniform dissolution to form the thin layer necessary for conduction. Such dissolution is difficult and time-consuming.

A further disadvantage in the employment of the thick copper foils used with such bonding layers is encountered under circumstances where it is necessary to provide a hermetic seal between the ceramic substrate and a covering element. When connections with circuits outside the covering element are necessary, one or more conductive traces must project through the seal between the covering element and the substrate. This is impossible in the case of thick copper foils, since the seal is broken.

The present invention includes a method for preparing a highly adherent conductive layer on a refractory substrate. Said adherent layer is very thin, is readily patterned and is capable of increasing the adhesion of subsequently deposited metal layers thereon. Also provided are substrates having such highly adherent conductive layers deposited thereon, especially in further combination with further electroless or electrolytically deposited metal.

In one of its aspects, therefore, the invention is a method for preparing an adherent layer comprising elemental titanium on a ceramic substrate comprising combined aluminum, said method comprising:

coating at least a portion of said substrate with a coating mixture comprising (1) at least one finely divided metal comprising elemental titanium and (2) a substantially anhydrous salt composition comprising at least one ionic inorganic salt, said salt composition having a melting point no higher than about 850° C.;

heating the coated substrate at a temperature and for a time sufficient to melt said salt composition and produce the desired layer; and removing said salt composition.

The substrates employed in the method of this invention include all known ceramic substrates. The preferred substrates are alumina and aluminum nitride, by reason of the smoothness of their surfaces which permits deposition of conductive traces capable of handling gigahertz frequencies of the type encountered in microwave apparatus. The high thermal conductivity of aluminum nitride makes it the preferred substrates in power circuits, while alumina is generally preferred for other types of circuitry because of its availability and relatively low cost.

Other ceramics such as glass may be blended with the alumina or aluminum nitride, typically in minor proportions. However, glass-containing substrates may not have the same problems of adhesion as those not containing In the first step of the method of this invention, the substrate is coated with a coating mixture comprising elemental titanium and a specific salt composition. Said coating mixture may contain other elemental metals, even in major amounts, in addition to titanium. Particularly useful are titanium-copper mixtures, typically containing about 10-99 mole percent titanium with the balance being copper.

The metal should be finely divided. It is typically in powder form.

Also present in the coating mixture is a salt composition comprising at least one ionic salt. It is essential that said salt composition have a melting point no higher than about 850° C., since above that temperature sintering and caking of the finely divided metal may occur. Any inorganic salt or mixture of such salts having the required melting point may be employed, provided it is stable when melted.

It is also essential that the salt composition be substantially anhydrous prior to the subsequent heating step, although the coating mixture may be applied in the form of an aqueous paste. The presence of water during heating may cause gas bubbles and resultant voids in the coating produced.

The preferred salts are alkali metal halides, especially potassium chloride and sodium chloride in admixture. Particularly preferred are equimolar mixtures of sodium chloride and potassium chloride, which are the eutectic mixtures of these salts.

Prior to coating application of the coating mixture, it is preferred to clean the substrate by methods known in the art. A typical cleaning operation involves applying to the substrate an aqueous solution of a mineral acid, typically an aqueous sulfuric acid solution with a concentration of about 5-20% by weight.

Various options are available for coating the substrate with the coating mixture, and the required proportion of metal in the coating mixture will depend to some extent on which option is employed. If the proportion of metal is too small, the resulting metal coating may contain voids.

In one coating option, the substrate is immersed in a mixture which typically comprises about 20-40% and preferably 20-30% (by weight) metal, with the balance being salt, in a vessel suitable for high temperature operations. A suitable laboratory-scale vessel is a porcelain crucible.

In a preferred coating option, the substrate is contacted with a paste in which the solid constituents comprise about 20-50%, preferably about 25-45% (by weight), metal with the remainder being salt. The liquid phase of said paste is an inert liquid, preferably water. The paste may be applied by a method such as brushing, roller coating or spraying, after which the liquid is removed, typically by heating in contact with air. Alternatively, application may be in the form of an ink which is "written" on the substrate with a pen, particularly one capable of computerized operation. Other art-recognized methods such as screen printing may also be employed.

To ensure uniform contact of the metal with the substrate, it is frequently preferred that the coated substrate be contacted with a further layer of the salt composition. It is then placed in a heat-resistant vessel of the type previously described.

The coated substrate is then heated, preferably in an inert atmosphere such as argon or under vacuum, at a temperature and for a time sufficient to melt said salt composition. (For the purposes of this invention, nitrogen is not an inert gas since it can react with titanium to form titanium nitride.) The heating temperature should be no higher than about 850° C. and is preferably about 775-825° C. In general, a heating time of about 1-4 hours is sufficient.

Following the heating step, the salt composition is removed. Any removal method which does not damage the integrity of the elemental titanium-containing layer on the substrate may be employed. Typically, the coating article is washed with water to dissolve away the salt.

The product of the method of this invention is a smooth ceramic substrate having on at least a portion of its surface a coating comprising elemental titanium, preferably an elemental titanium-copper mixture. Said coating has a substantially uniform thickness of about 0.2-1.5 microns, most often about 1 micron. The degree of adhesion of said coating to the substrate, as measured with a Sebastian adhesion tester, is at least about 650 kg./cm.$^2$. Coated substrates of this type are another aspect of the invention. In general, the coating contains titanium in substantial proportions, most often higher than the proportion present in the metal constituent of the coating mixture if a mixture of metals is employed.

Following deposition of the adherent layer in accordance with the present invention, a further layer of conductive metal, typically copper, may be deposited by operations such as sputtering, electroless deposition, electrolytic deposition or combinations thereof.

It is frequently preferred to heat-treat the article of this invention after deposition of the titanium-containing coating thereon, typically at a temperature in the range of about 475-550° C. and for a period of 5-10 minutes. Such heat treatment renders said further layer of conductive metal strongly adherent to the layer deposited according to this invention. Still another aspect of the invention is an article as described hereinabove which has a further coating of a conductive metal thereon, as well as the method of preparing such article.

The invention is illustrated by the following examples. All parts and percentages are by weight unless otherwise indicated.

EXAMPLE 1

An alumina coupon was cleaned by immersion in a solution of 15% aqueous sulfuric acid. It was then placed in a crucible in contact with a coating of a mixture of 26.4% elemental metal and 73.6% salt, the elemental metal consisting of 325 mesh titanium powder and 100 mesh copper powder in equimolar proportions and the salt consisting of potassium chloride and sodium chloride in equimolar proportions. The coupon and coating mixture were heated for 2 hours at 800° C. in an argon atmosphere, and subsequently cooled. The salt was removed from the substrate by washing with water. The product was a coupon uniformly coated with a titanium-copper layer about one micron in thickness. The adhesion of the metal layer, as measured by a Sebastian adhesion tester, was in excess of 700 kg./cm.$^2$, the upper limit of the test.

EXAMPLE 2

The procedure of Example 1 was repeated, substituting an aluminum nitride coupon for the aluminum coupon. The coupon was uniformly coated with a titanium-copper layer about 0.4 micron thick, which had an adhesion in excess of the limit of the test.

EXAMPLE 3

The procedure of Example 1 was repeated, except that the metal powder was entirely titanium. Similar results were obtained.

EXAMPLE 4

An alumina coupon similar to that employed in Example 1 was cleaned with 15% aqueous sulfuric acid solution and an aqueous paste consisting of 6 parts of 325 mesh titanium metal powder, 8 parts of 100 mesh copper powder, 20 parts of an equimolar mixture of potassium chloride and sodium chloride and sufficient water to form a paste was applied by painting with an artist's brush. The coated coupon was dried in an air oven for 15 minutes at 125° C., placed in an alumina crucible and covered with a layer of potassium chloride and sodium chloride in equimolar amounts. The crucible was heated for 2 hours at 800° C. in an argon atmosphere and cooled, after which the salt was removed by water washing. The resulting article had properties similar to those of the product of Example 1.

EXAMPLE 5

The procedure of Example 4 was repeated, except that the additional potassium chloride-sodium chloride mixture was omitted. The product had a well adhered, uniform and continuous titanium-copper layer, which, however, was not as smooth as that of the product of Example 4.

What is claimed is:

1. A method for preparing an adherent layer comprising elemental titanium on a ceramic substrate comprising an aluminum compound, said method comprising:
    coating at least a portion of said substrate with a coating mixture comprising (1) at least one finely divided metal comprising elemental titanium and (2) a substantially anhydrous salt composition comprising at least one alkali metal halide, said salt composition having a melting point no higher than about 850° C.;
    heating the coated substrate at a temperature and for a time sufficient to melt said salt composition and produce the desired layer; and
    removing said salt composition by water washing.

2. A method according to claim 1 wherein said substrate is alumina or aluminum nitride.

3. A method according to claim 2 wherein the coated substrate is heated at a temperature in the range of 775–825° C.

4. A method according to claim 2 wherein the metal consists of titanium.

5. A method according to claim 2 wherein the metal is a mixture of titanium and copper.

6. A method according to claim 5 wherein said mixture of titanium and copper comprises about 10–99 mole percent titanium.

7. A method according to claim 2 wherein the salt composition is a potassium chloride-sodium chloride mixture.

8. A method according to claim 7 wherein the potassium chloride and sodium chloride are present in equimolar amounts.

9. A method according to claim 2 wherein the substrate is immersed in a coating mixture comprising about 20–30% metal by weight, with the balance being salt.

10. A method according to claim 2 wherein the substrate is coated with an aqueous paste in which the solid constituents comprise about 25–45% metal by weight, with the remainder being salt.

11. A method according to claim 10 wherein the coated substrate is further contacted with a further layer of the salt composition prior to heating.

12. A method according to claim 2 wherein the heating step is conducted in an inert atmosphere.

13. A method according to claim 2 which includes the further step of depositing a layer of conductive metal by at least one of sputtering, electroless deposition and electrolytic deposition after removal of said salt composition.

* * * * *